May 30, 1967   G. J. BECKER   3,322,449
BLIND FASTENER SYSTEM
Filed June 18, 1964   2 Sheets-Sheet 2

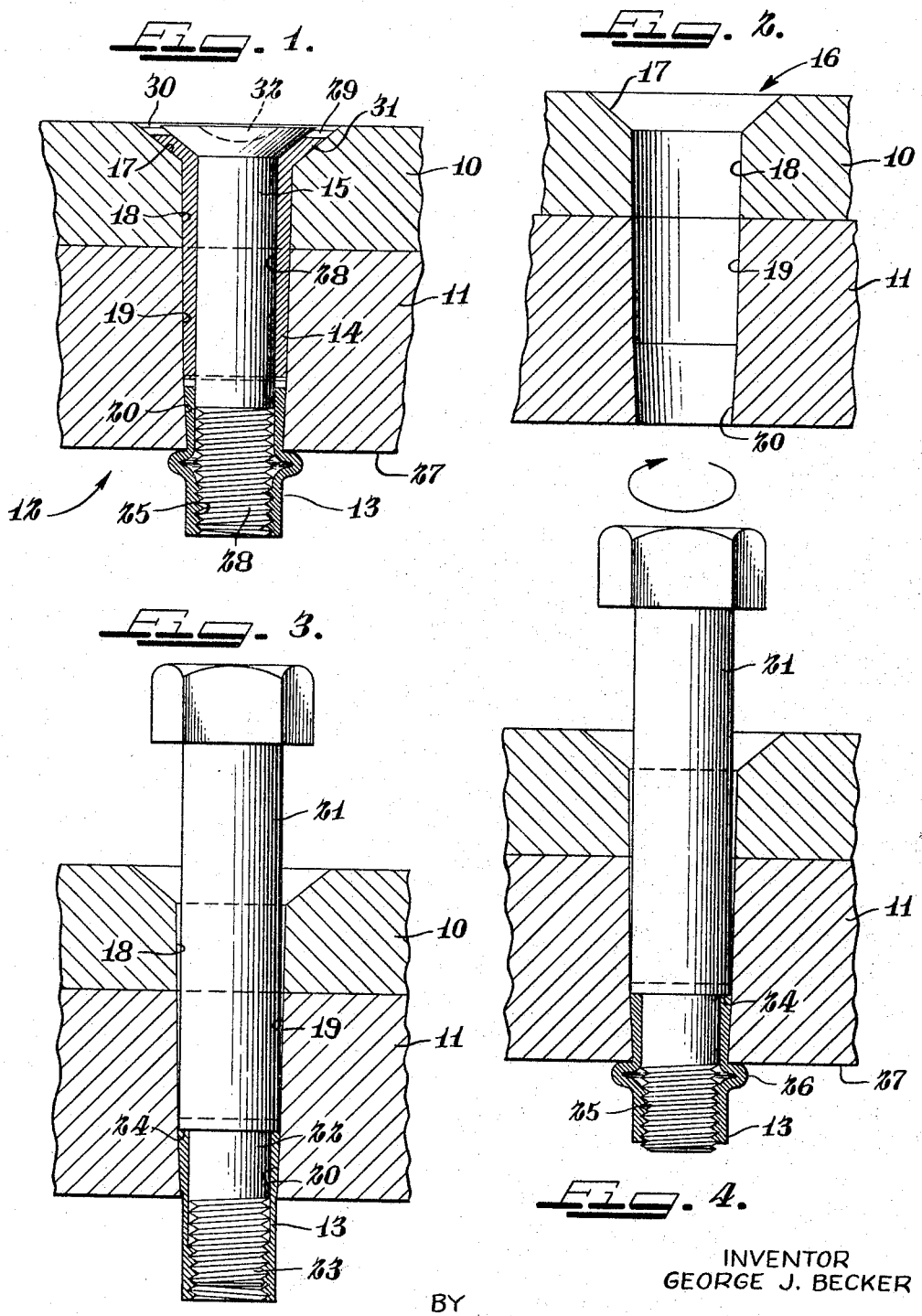

INVENTOR
GEORGE J. BECKER
BY
Greist, Lockwood, Greenawalt & Dewey
Attys.

United States Patent Office 3,322,449
Patented May 30, 1967

3,322,449
BLIND FASTENER SYSTEM
George J. Becker, Sepulveda, Calif., assignor to VSI Corporation, Pasadena, Calif., a corporation of Illinois
Filed June 18, 1964, Ser. No. 376,120
7 Claims. (Cl. 287—189.36)

This invention relates to improves in blind fasteners and more particularly relates to a new and improved blind fastening system and method of installing the same.

In aircraft and aerospace applications, a need has existed for a blind fastener which is capable of withstanding rather substantial amounts of force in shear and tension. In fulfilling this demand, it is desirable to provide a fastener which is of a simple design, and as easily installed as is possible within the design and performance limitations.

The present invention is directed to a novel blind fastening system which includes: a tapered nut inserted in a similarly shaped hole so as to be in interference therewith, and is thereafter locked or seated in position from the front side of the members to be joined. The tapered nut, when fully seated in one of the parts to be joined, does not scratch, mar, indent or in any manner cause imperfections sensitive to high fatigue and a potential source of stress concentration. A tapered sleeve lines the balance of the hole unoccupied by the tapered nut and a threaded fastener extends through the sleeve with a close fit into threaded engagement with the tapered nut to clamp the parts to be joined together.

In order to install the blind fastening system, the tapered nut is seated in a tapered hole with an interference fit with one end thereof projecting from the blind side of the member to be joined. A work bolt is used to hold one end of the tapered nut in position while torque is applied drawing the other end of the tapered nut thereto. During this operation, a smooth single fold bellows is formed by the projecting portion of the tapered nut expanding radially outwardly of the hole from which it projects thereby preventing pull-out from the front or nonblind side. Push-out is prevented by the interference tapered fit between the outer circumference of the locking taper on the nut and the tapered hole. The locking taper in the hole cooperating with the taper on the nut also serves, when properly seated, to prevent rotation of the nut. Anti-rotation means which permits holding of the nut from the front side is also contemplated as being within the purview of the present invention.

The advantages obtained by the use of the blind fastening system of the present invention will become more readily apparent upon a consideration of the objects to be achieved, and the detailed description of the blind fastener to follow.

It is therefore an object of this invention to provide a new and improved blind fastener, and novel method of installing the same.

It is a further object of this invention to provide a blind fastening system having a tapered nut which may be inserted and locked in position from the front or non-blind side of the structure, said nut being designed so that when fully seated it will not scratch, mar or indent in any manner to cause a notch in the members to be joined which would be sensitive to high fatigue.

It is a further object of this invention to provide a new and improved blind fastening system including a tapered nut adapted to be fitted into a tapered hole and torqued into position, and a tapered sleeve liner to prevent damage to the hole by the threaded fastener cooperating with the tapered blind nut.

It is a further object of this invention to provide a blind fastener system wherein the tapered sleeve is formed with a countersunk portion to co-operate with a similarly shaped head on the bolt, the countersink being formed after insertion of the sleeve into the structural members to be joined and formed simultaneously with a coextensive countersink in the front side of the member to be joined.

Further and fuller objects will become readily apparent when reference is made to the accompanying drawings wherein:

FIG. 1 is a vertical section showing one embodiment of the blind fastener of the present invention in the fully installed position, the tapered bolt being shown in elevation;

FIG. 2 is a cross sectional view through the members to be joined taken across the diameter of a fully prepared hole adapted to receive the blind fastener as shown in FIG. 1;

Figure 5:
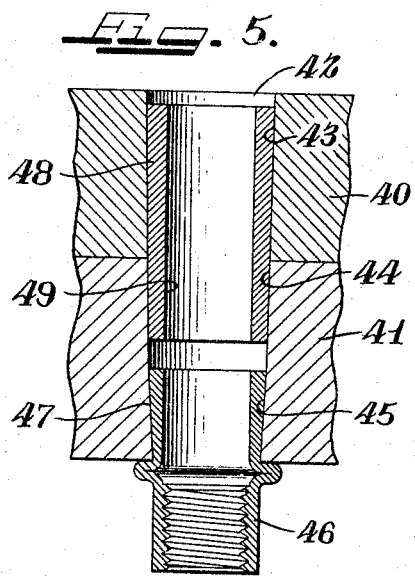
Figure 6:
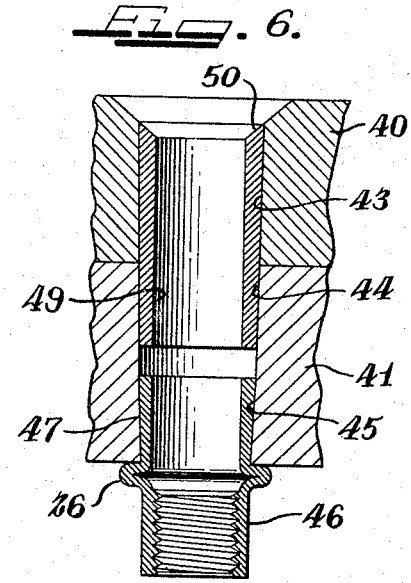
Figure 8:
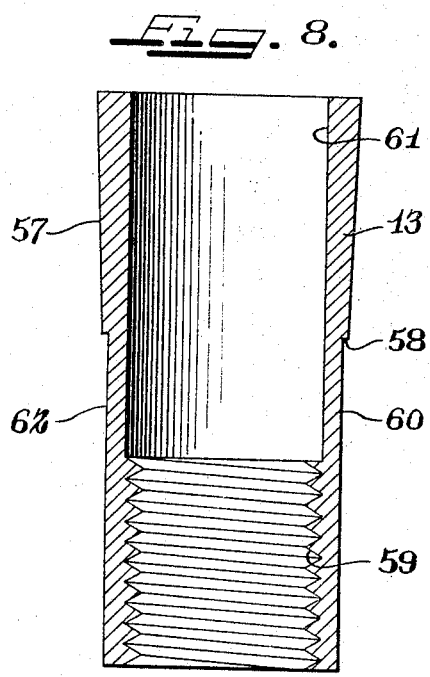
Figure 7:
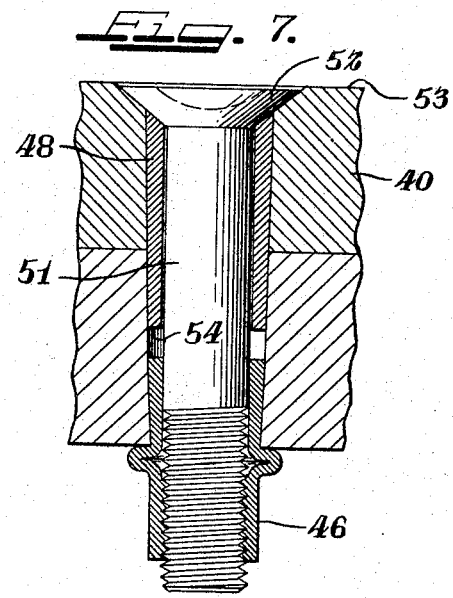

FIGS. 3 and 4 pictorially illustrate the method steps of installing the tapered nut;

FIG. 5 is a cross sectional view of two members to be joined having a tapered nut installed and torqued into position, and a modified tapered sleeve inserted therein, both of which are shown in cross section;

FIG. 6 is the view of FIG. 5 after the counter bore has been formed simultaneously in one of the members to be joined and the tapered sleeve also;

FIG. 7 is the finished assembly of FIGS. 5 and 6 after the bolt has been installed; and FIG. 8 is an enlarged cross sectional view of the tapered nut of the present invention.

In FIG. 1, reference numerals 10 and 11 indicate a pair of structural members to be joined and reference character 12 generally indicates the blind fastening system of the present invention which includes a tapered nut 13, sleeve 14 and bolt 15. As is evident in FIG. 1, the nut 13 is mounted in the blind side whereas the bolt 15 faces the front or non-blind side of the structure.

A better understanding of the completed blind fasten-assembly and the salient features of the present invention may be had by consideration of the steps performed in the installation thereof. Referring to FIG. 2, the plates or members to be joined are designated by reference characters 10 and 11 being illustrated in a cross sectional view taken across one of the diameters of the hole indicated generally at 16.

The hole 16 includes a countersunk portion 17 on the non-blind side which may be prepared in the usual manner. A central portion 18 and 19 of the hole 16 is formed in each of the members 10 and 11, being slightly tapered with the taper diminishing toward the blind side. The lower portion 20 of the hole 16 in the member 11 is formed on a slightly greater taper than the central portions 18 and 19 of the hole 16 and is of reduced diameter as it emerges on the blind side of the member 11 to be joined.

In installing the blind fastener of FIG. 1, FIG. 2 represents the first method step which may be broadly termed preparing the hole. This is accomplished in any desired manner such as drilling and reaming, machining or the like. Upon completion of the hole preparation step as illustrated in FIG. 2, the tapered nut 13 is installed. The outer circumference of the nut 13 is tapered so when seated as shown in FIG. 3, it is in interference engagement with the lower portion 20 of the hole 16. The taper on the central portion of the hole 18 and 19 is readily visible when compared with the straight cylindrical section on the bolt 15.

A work bolt 21 is provided with a lower end portion 22 of reduced diameter and the usual threads 23. The lower end portion 22 of reduced diameter forms with the main portion of the bolt a shoulder 24 which abuts the inner end of the tapered nut 13 as it is threaded thereon preparatory to insertion into the tapered hole 16.

As seen in FIG. 4, torque is applied to the bolt, being denoted by the arrow above the headed portion of the bolt, causing the lower or projecting end of the tapered nut 13 to move towards the inner end which is in engagement with the shoulder 24 on the bolt 21. Continued rotation of the work bolt 21 causes the internal threads 25 on the tapered nut 13 to move up the external helical threads 23 on the work bolt. Throughout this rotation and movement, the inner end of the tapered nut 13 is held from rotational movement by being in interference engagement with the tapered bore. Longitudinal movement of the inner end of the tapered nut 13 in the direction of withdrawal is precluded by engagement with the shoulder 24 on the work bolt 21. A single fold bellows 26 is thereby formed in the central portion of the tapered nut 13 immediately adjacent the lower end of the hole 16 and rolling smoothly to overlie the inner surface or blind side 27 of the member to be joined 11. The bellows fold 26 serves to draw and maintain the tapered nut 13 into interference engagement with the tapered lower portion 20 of the hole 16 to firmly keep the nut 13 in place. Undesirable marring, scratching or notching of the surface 27 around the lower end of the hole 16 is avoided by the novel installation method. The interference tapered fit of the nut 13 with the lower portion of the nut 20 is sufficient to prevent rotation of the nut 13. The work bolt 21 may then be removed by rotating in an opposite direction.

Referring once again to FIG. 1, after the work bolt 21 has been removed the tapered sleeve liner 14 may be positioned in the tapered hole and the bolt 15 inserted through a central bore in the sleeve 14 and rotated so that the threaded portion 28 is in engagement with the internal threads 25 on the tapered nut 13. A pair of cross slots 29 and 30 are provided in the outwardly flaring portion 31 of the sleeve 14 which also lines the counterbore 17 of the hole 16. The cross slots 29 and 30 permit a spanner wrench or the like to be used to prevent the sleeve from rotating as the bolt 15 is seated in the nut 13. The bolt 15 may be rotationally driven by a tool interfitted into a tool recess or slot 32 which may be of the type described in Patent No. 2,677,985 or any one of the well known forms in the art.

It can be appreciated that the blind fastener arrangement of FIG. 1 permits the bolt and sleeve to be removed and re-installed a number of times without fear of damage to hole 16. The locking taper formed on the nut 13 is sufficient to maintain the nut securely positioned on the blind side of the hole at all times, and when properly installed will prevent rotation of the nut 13. Obviously, interlocking lugs and slots may be provided alternately on the sleeve 14 and nut 13 to permit holding the nut against rotation from the front side of the system if desired. In the ordinary use of the system, the locking taper of the nut 13 and the hole is sufficient to restrain rotation of the nut 13.

Referring now to FIG. 5, a pair of plate-like members 40 and 41 which are to be joined by a blind fastener are illustrated in cross section across the diameter of an aligned hole 42 through each of the members. The front or non-blind side of the hole 42 is provided with a smoothly tapered portion 43 which is coextensive with a tapered portion 44 in the member 41. The lower or blind side of the hole 45 is provided with an increased taper such as was described in connection with FIG. 2. Expressed another way, FIG. 5 is basically the same as the hole of FIG. 2, with the counterbore 17 omitted and a nut 46 and sleeve 48 installed.

The nut 46 is provided with a tapered circumferential portion 47 adapted for interference engagement with the lower tapered portion 45 of the hole 42. The nut 46 is seated through use of a work bolt or the equivalent in the manner described in connection with FIGS. 3 and 4.

A tapered sleeve 48 having a central cylindrical bore 49 is inserted into close fitting engagement with the tapered portions 43 and 44 of the hole 42 to maintain the members to be joined 40 and 41 properly oriented with respect to each other.

As seen in FIG. 6, a counterbore 50 is formed coaxial with the central axis of the hole 42 in the front side of the member 40 to be joined. The counterbore 50 may be formed by any suitable method or tool which simultaneously forms a suitable counterbored portion on the front or outer end of the sleeve 48 permitting the bolt to be seated flush with the front side of the member 40 to be joined.

FIG. 7 represents an illustration of the completion of the assembly steps shown in FIGS. 5 and 6. A bolt 51 is fully seated in the tapered nut 46 so that the frustoconical head portion 52 is substantially flush with the outer surface 53 on the front side of the plate-like member 40. The inner end of the tapered sleeve 48 identified by reference character 54, stops short of the inner end of the nut 46 to permit a tool to be inserted to withdraw the sleeve 48 should it become desirable to separate the members 40 and 41. Any known form of sleeve puller may be used so long as care is taken not to mar the interior finish of the hole 42.

It is obvious that any suitable taper may be used for the hole, depending upon the size of the fastener and the particular application. In one embodiment utilizing a bolt having a shank diameter of about ¼ inch, the taper on the sleeve was of the order of about ½°. The external taper on the nut was of the order of about 2¼° with a co-operating taper formed in the lower portion or blind side of the hole. These dimensions are given by way of illustration only and are not intended to be limiting since it is obvious that as the applications differ it may be desirable to change the relative dimensions.

An enlarged cross sectional view of the tapered nut 13 is illustrated in FIG. 8 to depict the detailed features thereof. The nut is formed with an external taper 57 which is adapted for interference engagement with the co-operating tapered surface 45 in the hole. The taper 57 terminates by a shoulder portion 58 which is radially extending and extends circumferentially about the nut 13.

A threaded portion 59 is formed in the lower end of the nut in a region of increased thickness. The central section, indicated generally at 60, between the threaded portion 59 and the shoulder 58 is of reduced thickness so as to provide a control section adapted to form the single fold bellows which locks the nut 13 in the tapered hole.

A central bore 61 through the tapered nut 13 is generally cylindrical as is the outer circumferential surface 62 in the intermediate region 60 of reduced thickness. It is contemplated that the shoulder portion 58 will be substantially coextensive with the lower or blind hole in which it is inserted thereby controlling the fold of the bellows outwardly of the hole so that it may smoothly overlie the inner surface snugly locking the taper 57 on the nut 13 in place.

The blind fastening system of the present invention is adapted to withstand a high fatigue structural application of shear and tension while being relatively simple. Due to the unique construction and novel method of installing the blind fastener, the structural members to be joined are protected from the likelihood of being scratched, notched or the like while still providing good clamping action to join the members. The use of a sleeve liner, not only protects the hole, but additionally aligns the members to be joined and precludes relative lateral movement of one part relative to the other which would have a tendency to shear the fastener.

Upon a consideration of the foregoing, it will become obvious to those skilled in the art that various modifications may be made without departing from the invention embodied herein. Therefore, any limitations imposed are

I claim:

1. A blind fastening system comprising:
at least first and second plate-like members in overlapping relation with each other, such members having a hole with a blind and extending therethrough, one end portion of said hole having a taper converging towards the blind end;
a nut including a longitudinally tapered portion converging towards the blind end, such tapered portion being in interference engagement with the tapered portion of said hole, a second portion projecting outwardly of the blind end of the hole, thread means formed in said second portion of said nut, and a single fold bellows formed intermediate said tapered portion and said thread means and overlapping the one of said plate-like members adjacent the blind end of said hole to prevent withdrawal of said nut in a direction away from said converging taper in said hole; and
means substantially filling said hole and having a portion thereof in removable threaded engagement with said thread means thereby holding said first and second plate-like members together.

2. The blind fastening system of claim 1 wherein said means substantially filling said hole and having a portion thereof in engagement with said theread means comprises a sleeve liner for said hole and a headed fastener positioned within said sleeve and having its lower end in removable threaded engagement with said thread means.

3. The blind fastening system of claim 2 wherein said hole is tapered above said tapered end portion with the hole taper converging to meet said tapered end section, and said sleeve liner is provided with a complementary exterior taper.

4. The blind fastening system of claim 2 wherein said sleeve liner is provided with a counterbore adapted to receive a complementary shaped portion on said headed fastener.

5. The blind fastening system of claim 4 wherein means is provided adjacent the couterbored portion of said sleeve liner to receive tool means to hold said sleeve liner against rotation.

6. The blind fastening system of claim 4 wherein said counterbored portion on said sleeve is coextensive with a counterbored portion in one of said plate-like members to permit said counterbores to be formed simultaneously.

7. A blind fastener system comprising at least two members to be joined said members having a tapered hole therethrough with the taper converging towards the blind side of the members, a tapered nut at the smaller end of said tapered hole and having a circumferential portion in interference engagement therewith, a portion of said nut extending beyond the blind side of the members from said hole and being expanded to a diameter greater than the diameter of the hole from which said nut emerges, a tapered sleeve fitted within said hole and in close fitting engagement therewith and a headed fastener extending through said sleeve into threaded engagement with said nut to join said members.

References Cited

UNITED STATES PATENTS

| | | | |
|---|---|---|---|
| 2,282,711 | 5/1942 | Eklund | 85—72 |
| 2,974,558 | 3/1961 | Hodell | 85—77 |
| 3,034,611 | 5/1962 | Zenzic | 189—36 |
| 3,180,203 | 4/1965 | Vaughn | 85—70 |
| 3,193,921 | 7/1965 | Kahn | 189—36 X |
| 3,236,143 | 2/1966 | Wing | 85—70 |
| 3,257,889 | 6/1966 | Fischer | 85—70 |

DAVID J. WILLIAMOWSKY, *Primary Examiner.*

HARRISON R. MOSELEY, *Examiner.*

J. K. BELL, *Assistant Examiner.*